United States Patent [19]

Hoffman

[11] 3,713,159

[45] Jan. 23, 1973

[54] AIRCRAFT LANDING SYSTEMS
[75] Inventor: Murray Hoffman, Livingston, N.J.
[73] Assignee: International Telephone and Telegraph Corporation, Nutley, N.J.
[22] Filed: Aug. 14, 1970
[21] Appl. No.: 63,812

[52] U.S. Cl..............343/102, 343/107, 343/108 R, 343/112 A, 343/112 D
[51] Int. Cl..............................................G01s 1/02
[58] Field of Search ...343/108 R, 101, 112 D, 112 A

[56] References Cited

UNITED STATES PATENTS

2,400,232  5/1946  Hall......................................343/101
2,097,072  10/1937  Lock............................343/108 R X

Primary Examiner—Samuel Feinberg
Assistant Examiner—Richard E. Berger
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

From each of a plurality of predetermined spaced points along at least one side of a runway and an approach to the runway two antennas of the fan beam type radiate modulated radiation signals, one antenna radiating vertical modulated radiation signals and the other radiating a slanted modulated radiation signal having an angle A with respect to the runway and the approach, where angle A is preferably 45°, but may be any value greater than 5° but less than 90°, to provide a non-orthogonal coordinate system over the runway and the approach. The respective radiation signals from each point are made distinctive, such as by a different carrier signal frequency, and the modulation, such as binary coded information, gives the distance of the associated point from a reference point, such as the desired touchdown point on the runway. A receiving device carried by a landing aircraft will be able to display (1) the distance to touchdown by recovering the distance of the associated spaced point from touchdown of an intercepted vertical radiation signal and (2) the height of the aircraft above the runway and the approach by subtracting the distance of the associated one of the spaced points from touchdown obtained from an intercepted slanted radiation signal from the distance of the associated one of the spaced points from touchdown obtained from an intercepted vertical radiation signal adjacent the intercepted slanted radiation signal, if angle A is equal to 45°. If angle A is other than 45°, the resultant difference signal obtained by the above described subtraction is multiplied by the value of the tangent of angle A.

13 Claims, 6 Drawing Figures 3,713,159

AIRCRAFT LANDING SYSTEMS

BACKGROUND OF THE INVENTION

This invention relates to instrument landing systems (ILS) for aircraft and more particularly to a glide slope landing system.

In prior art glide slope landing systems, the accuracy of the system is disturbed by ground reflections because the radiation beams employed therein are at shallow angles, such as 1° to 4° (almost parallel), to the runway.

In an article entitled "Landing Jumbos and Low Visibility: A Pilot Protests" found in Astronautics and Aeronautics, May 1969, pages 58–60, an anonymous pilot has pointed out problems in landing aircraft, particularly of the jumbo bit type. In such aircraft, the greatest need is to provide a display of the distance to touchdown and the height of the aircraft above the runway and its approach. At present the height above the runway is provided by a radar altimeter whose accuracy is, at low levels necessary in landing, reduced due to ground and obstacle clutter.

SUMMARY OF THE INVENTION

An object of the present invention is the provision of a glide slope landing system in which the beams therein are elevated at high angles greater than 5° but less than 90°, such as 45° which substantially eliminates reduction in accuracy due to ground reflections of the prior art glide slope landing systems.

Another object of the present invention is the provision of a glide slope non-orthogonal coordinate landing system overcoming the disadvantage of prior art glide slope landing systems.

Still another object of the present invention is the provision of a glide slope non-orthogonal coordinate landing system which will provide to the pilot a display of the distance to touchdown and the height of the aircraft above the runway or the approach to the runway with greater accuracy than is presently obtainable with radar altimeters.

A further object of the present invention is the provision of a glide slope non-orthogonal coordinate landing system which will provide to the pilot a display of the distance to touchdown and the height of the aircraft above the runway or the approach to the runway with an accuracy equal to ± one half the spacing between adjacent spaced points along the runway and the approach to the runway.

Still a further object of the present invention is the provision of a glide slope non-orthogonal coordinate landing system which can guide a greater number of aircraft per unit of time to a landing than the presently employed GCA (Ground Control Approach) radar system.

A feature of the present invention is the provision of an instrument landing system for a runway and an approach to the runway to assist an aircraft in landing on the runway comprising first means disposed in juxtaposition to the runway and the approach to provide a non-orthogonal coordinate system of modulated radiation signals over the runway and the approach, each pair of the radiation signals forming the coordinate system appearing to come from different predeterminedly spaced points along the runway and the approach extending in the direction of the approach commencing with and including a desired touchdown point on the runway, the modulation of the radiation signals providing the distance of its associated one of the spaced points from the touchdown point; and second means disposed in the aircraft for detecting the modulation of those of the radiation signals intercepted by the aircraft to provide a first indication of the height of the aircraft above the runway and the approach and a second indication of the distance the aircraft is from the touchdown point.

Another feature of the present invention is the provision in an instrument landing system for a runway and an approach to the runway to assist an aircraft in landing on the runway, an arrangement disposed in juxtaposition to the runway and the approach to provide a non-orthogonal coordinate system of modulated radiated signals over the runway and the approach comprising a first antenna disposed in juxtaposition to each of a plurality of predeterminedly spaced points along the runway and the approach extending in the direction of the approach commencing with and including a desired touchdown point on the runway, each of the first antennas radiating a vertical modulated radiation signal with respect to the runway and the approach, each of the vertical radiation signals appearing to radiate from the associated one of the spaced points, the modulation of each of the vertical radiation signals providing the distance of its associated one of the spaced points from the touchdown point; and a second antenna disposed in juxtaposition to each of the spaced points, each of the second antennas radiating slanted modulated radiation signal, the angle of each of the slanted radiation signals with respect to the runway and the approach being greater than 5° but less than 90°, each of the slanted radiation signals appearing to radiate from the associated one of the spaced points, the modulation of each of the slanted radiation signals providing the distance of its associated one of the spaced points from the touchdown point.

A further feature of the present invention is the provision in an instrument landing system for a runway and an approach to the runway to assist an aircraft in landing on the runway having a non-orthogonal coordinate system of modulated radiation signals over the runway and the approach, the coordinate system being provided by radiation of a vertical modulated radiation signal with respect to the runway and the approach from each of a plurality of predeterminedly spaced points along the runway and the approach extending in the direction of the approach commencing with and including a desired touchdown point on the runway and by radiation of a slanted modulated radiation signal from each of the spaced points, the angle A of each of the slanted radiation signals with respect to the runway and the approach being greater than 5° but less than 90°, the modulation of each of the vertical and slanted radiation signals providing the distance of its associated one of the spaced points from the touchdown point; an arrangement disposed in the aircraft to display the height of the aircraft above the runway and the approach and to display the distance the aircraft is from the touchdown point comprising first means to recover the distances of the associated one of the spaced points from the touchdown point from which an intercepted one of the vertical radiation signals is radiated; second means to recover the distance of the associated one of the spaced points from the touchdown point from which an intercepted one of the slanted radiation signals, adjacent the intercepted one of the vertical radiation signals, is radiated; third means coupled to the first means and the second means to subtract the recovered distance of the intercepted one of the slanted radiation signals from the recovered distance of the intercepted one of the vertical radiation signals and to multiply the resultant difference by the value of the tangent of the angle A to produce an output signal equal to the height of the aircraft above the runway and the approach; fourth means coupled to the third means responsive to the output signal to display the height of the aircraft; and fifth means coupled to the first means responsive to the recovered distance of the intercepted one of the vertical radiation signals to display the distance the aircraft is from the touchdown point.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENT

Figures 1, 2, 3, 4, 5:
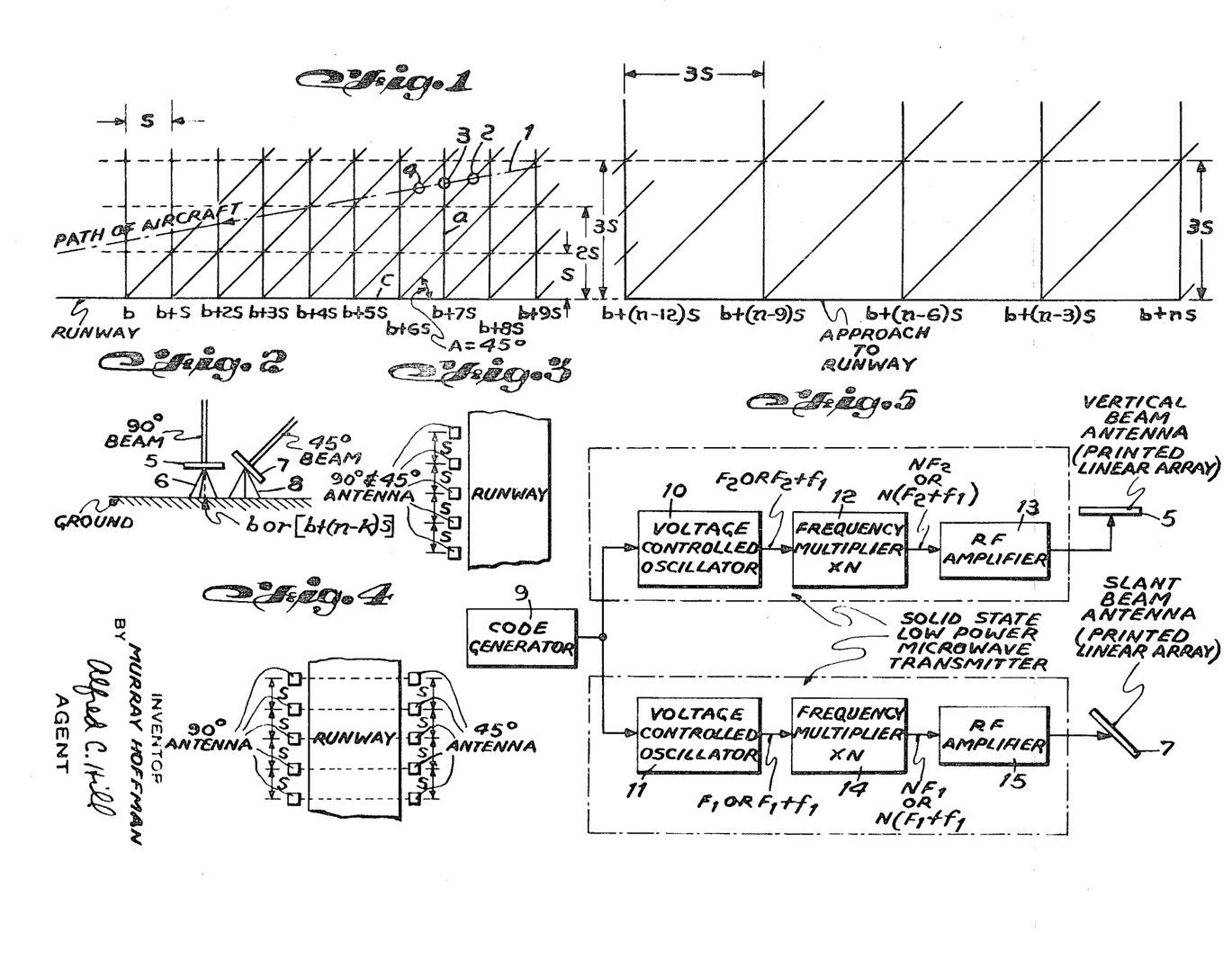
FIG. 1 illustrates a non-orthogonal coordinate glide slope landing system in accordance with the principles of the present invention.
FIG. 2 illustrates the arrangement of the antennas at each of the predeterminedly spaced points from which the coordinate system of FIG. 1 is generated.
FIG. 3 illustrates one embodiment of the relationship between the antennas at each predeterminedly spaced points of the non-orthogonal coordinate system of FIG. 1 with respect to the runway.
FIG. 4 is another embodiment of the relationship of the antennas at each of the predetermined spaced points of the non-orthogonal coordinate system of FIG. 1 with respect to the runway.
FIG. 5 is a block diagram of one embodiment of modulating the carrier signal radiated by the pair of antennas disposed in juxtaposition to each of the predeterminedly spaced points of the non-orthogonal coordinate system of FIG. 1.

Referring to FIG. 1, there is illustrated thereon one embodiment of the non-orthogonal coordinate system generated in accordance with the principles of this invention for incorporation in a glide slope type landing system. As illustrated there are a plurality of predeterminedly spaced points $b$ to $(b+ns)$ and from each of these spaced points there is radiated two beams, one beam being radiated vertically and the other beam being radiated in a slanted direction so that the angle A with respect to the runway and the approach to the runway is equal to 45°. These radiated beams contain modulated radiation signals giving the distance of their associated spaced points $(b+s)$ to $(b+ns)$ from a desired touchdown point b with a spacing s between each of these spaced points in the runway area. In area of the approach to the runway the spacing between adjacent spaced points is equal to $[b-(n-k)s]$, where n is an integer equal to the number of spaced points involved and $k$ is equal to an integer equal the number of the spaces s present in the spacing between adjacent space points. For purposes of illustration only it will be assumed that $s=1$ foot.

Each of the pair of radiation signals or beams from an associated one of the spaced pairs is modulated in some fashion, such as by binary coded signals, to indicate their distance from the touchdown point. The number of digits to provide this distance information will depend upon the distance the ILS system of this invention is to cover. For instance, a 12 bit code will define the distance of 4,095 feet or spaced points if $s=1$ foot throughout the system. It must be noted, however, that on the approach to the runway, where the spacing between adjacent spaced points is 3s, there are points for which a coded signal will not be generated to identify its distance from touchdown point $b$. However, the system still will be able to cover a distance of 4,095 feet from the touchdown point.

Let us now determine the accuracy possible with the non-orthogonal coordinate system of FIG. 1. With an aircraft traveling the line 1, the events at points 2, 3 and 4 on this dotted path will now be examined. As pointed out previously, the vertical and slanted beams from each of the spaced points are launched so that they appear to intercept the ground with spacing s when traced backwards. At position 2 the aircraft detects a coded slant beam emminating from spaced point $(b+5s)$. The aircraft next detects a vertical coded beam emminating from spaced point $(b+7s)$ at point 3. The equipment on board the aircraft calculates: (vertical beam coded distance or number) - (slanted beam distance or number) $=(b+7s)-(b+5s)=2s$. This is the approximate height of the plane by the trigonometry relationship of a 45° triangle wherein the side $a$ of the triangle $=$ side $c$ [the spacing between spaced points $(b+5s)$ and $(b+7s)$] times the tangent of angle A, wherein the tangent of a 45° angle equals 1.

At position 4, the aircraft detects slant beam emminating from space point $(b+4s)$ and calculates: [vertical beam number (distance from $b$)] — [slant beam number (the distance from b)] $=(b+7s)-(b+4s)=3s$. Thus, the system on board the aircraft has calculated a vertical beam and the two adjacent slanted beams that the height of the aircraft is either 2s or 3s. It can be seen from FIG. 1 that this is correct. If the computer on board the aircraft were to assign the value height $=(2s+3s)/2=2.5s$ to the aircraft height, the height of the aircraft, is correct to within $\pm 0.5s$, or one-half the spacing between the spaced points. An increased accuracy is possible by averaging and smoothing over many beam detections.

As the result of the measurement performed by the equipment on board the aircraft, the pilot not only knows the height of the aircraft above the runway, but he also knows the distance of the aircraft from touchdown point $b$ which is 7s. Having this information, the pilot will know he will have to come down more rapidly in order to touchdown at touchdown point $b$ and the pilot has time to adjust the attitude of the aircraft to achieve the desired touchdown point.

As previously pointed out the radiated beams or radiation signals do not have to be equally dense everywhere. Further from touchdown, such as on the runway approach, the density may be less as illustrated in FIG. 1 where every third spaced point radiates the pair of beams. It should be remembered that the density reduction achieved by the spacing of $3s$ is only an example and a density could be made less by implementing radiations of the pair of radiation signals from spaced points having a greater space than $3s$, for instance, having a space of $5s$. This adjustment of density of spaced points radiating the pair of radiation signals to generate the non-orthogonal coordinate system greatly reduces the number of coded radiation signals needed and a reduction in the equipment necessary to produce the pair of radiation signals at each point.

It is proposed that the radiated signals from each of the spaced points be millimeter waves in the frequency range of 15 ghz (gigahertz) or higher so that the atmospheric attenuation prevents interference with other airports. In addition, the radiated power is kept low to aid in preventing interference with other airports and other runways of the same airport.

It should also be pointed out that there are many locations where aircraft will be landing on the same runway from opposite directions at different times. The ILS system of this invention can be arranged to be disposed at both ends of the runway without interference between these two systems, since the slanted beam or radiation signals will be directed in opposite directions, namely, in the direction of the approach to the runway.

While the illustration of FIG. 1 illustrates the slanted radiation signal having angle A equal to 45° with respect to the runway and the approach to the runway, it is possible to set this angle A above or below 45°, but greater than 5° and less than 90°. The same processing will take place as described above with the addition of multiplying the resultant difference between adjacent vertical and slant beam coded distance information by the value of the tangent of angle A.

In the summary the ILS system of the present invention includes generating a non-orthogonal coordinate system of antenna beams with a pair of beams being radiated from each of a plurality of predeterminedly spaced points, one beam being radiated vertically and the other beam being radiated slanted with an angle A with respect to the runway and the approach to the runway being equal to 45° or above, but less than 90°. All of the radiated beams or radiation signals appear to originate at the ground from the spaced point. However, an arrangement as illustrated in FIG. 2 can be employed in juxtaposition to a spaced point to provide the pair of beams radiated from that point. The arrangement of FIG. 2 includes an antenna 5 supported above ground by tripod 6 to provide a vertical beam. The 45° beams are provided by antenna 7 supported on a tripod 8 positioned with respect to the spaced point such that the projection of the beam toward the ground intercepts the associated spaced point on the ground thereby making the 45° beam appear to come from the ground. In the aircraft the difference in the numbers of any vertical beam and adjacent slanted beams at a point above the runway or the approach to the runway equals the height of that point above the runway. All that is necessary is that the pair of beams originating from associated ones of the spaced pairs contain simple modulation giving its distance from touchdown point, or in the instance where the spacings between the spaced points is equal to 1 foot, the number of the beam increasing from the touchdown point toward the approach to the runway. All that is required in the aircraft is a receiver to detect the numbers of the vertical and adjacent slanted beams, make a subtraction in real time and then display this difference to the pilot, and as required to the auto pilot, for use in landing the plane.

With reference to FIG. 2, antennas 5 and 7 at each of the spaced points in the system of FIG. 1 may be of the linearly polarized mat strip type providing a fan type beam so that these pairs of antennas at each of the spaced points may be disposed along one edge of the runway as illustrated in FIG. 3 and yet an aircraft landing in the center of the runway will be able to intercept the vertical and slanted beams, since the fan beam type radiation will, in effect, dispose a vertical and slanted plane of radio signal across the runway.

Referring to FIG. 4, there is an alternative disposition of the pair of antennas for each of the spaced points. This arrangement is to place the antennas providing the 90° or vertical radiation signal on one side of the runway at each of the n spaced points and dispose the 45° antennas on the other side of the runway at identically the same distance from the touchdown point. As far as the aircraft is concerned, it will still intercept the vertical and slanted beams which appear if they were radiated from the identical point on the ground.

Referring to FIG. 5, there is illustrated therein for purposes of explanation only, one implementation of a ground beacon disposed in juxtaposition to each of the spaced points so as to establish the non-orthogonal coordinate system of FIG. 1. Code generator 9 generates a particular code in binary form so as to identify the distance a particular point is from touchdown and, in turn the radiation signal or beam number when $S = 1$ foot. To cooperate with the aircraft receiver which will be described hereinbelow with respect to FIG. 6 the format of the code generated by generator 9 includes 24 bits with the first 12 bits being all binary "1" for use as synchronizing bits in the aircraft receiver. The second 12 bits gives in the conventional binary format the distance to a particular spaced point anywhere in 4,095 ft. from touchdown. The number of the second 12 bits may be increased or decreased depending upon how many feet from touchdown the non-orthogonal coordinate system of this invention is to be employed. The code generated for modulation on both the vertical and slanted beams at point $b$ would be 12 "1's" and 12 "0' s". The code generated at point ($b + s$) would be 111111111111000000000001. The coded signal generated at point ($b + 2s$) would be 111111111111000000000010. The remaining successive spaced points would be identified by the successive binary code indicating in binary form 3, 4, 5, etc. In the approach to the runway area where the beam density is less the coded assigned to these spaced points would be the same as if all the points spaced by the spacing s were present, but only those points illustrated being implemented and identified by a radiated code signal.

One form generator 9 can take is a register appropriately wired and coupled to a parallel to serial converter to provide the desired 24 bit code signal. Alternatively, switches connected to appropriate voltage sources could be used to generate the desired code for a particular one of the spaced points. In the example illustrated in FIG. 5 the code from generator 9 is modulated on two different carrier signals, one carrier signal for the vertical beam and the other carrier signal for the slanted beam, by means of frequency shift keying (FSK). There are many forms of FSK modulation, one of which is illustrated in FIG. 5. The output from generator 9 is coupled to voltage controlled oscillator 10 so that a binary "0" will produce a frequency F2 while a binary "1" will produce a frequency $F2 + f1$. The output from generator 9 is also coupled to voltage controlled oscillator 11 arranged to provide a frequency F1 when excited by a binary "0" and a frequency $F1 + f1$ when excited by a binary "1". The vertical beam antenna 5 is excited to provide a code modulated radiation signal by first multiplying the frequency output of oscillator 10 by a factor N in frequency multiplier 12 and then applying the output from multiplier 12 to a radio frequency amplifier 13 whose output is coupled to antenna 5. To produce the slanted radiation signal from antenna 7, the output from oscillator 11 is coupled to frequency multiplier 14 which multiplies the frequency of oscillator 11 by a factor of N and the output of multiplier 14 is amplified in radio frequency amplifier 15 prior to coupling to antenna 7.

As part of the example being described herein, it is assumed that the frequency NF2 is equal to 14,980 Mhz (megahertz) and the frequency NF1 is equal to 15,020 Mhz and that the value of the frequency of $Nf1$ is equal to 5 Mhz. In addition, since it is necessary to receive one complete code signal in any one beam the shortest basic time an aircraft is in a beam is assumed to be 2.272 ms (milliseconds). A longer time in a beam makes the receiving arrangement work better. Each of the 24 bit code signals is considered to be a code frame and has a length of 0.2272 ms. Thus, 10 frames will be received on the average when the aircraft is present in a beam for its shortest basic time (2.272ms).

Figure 6:
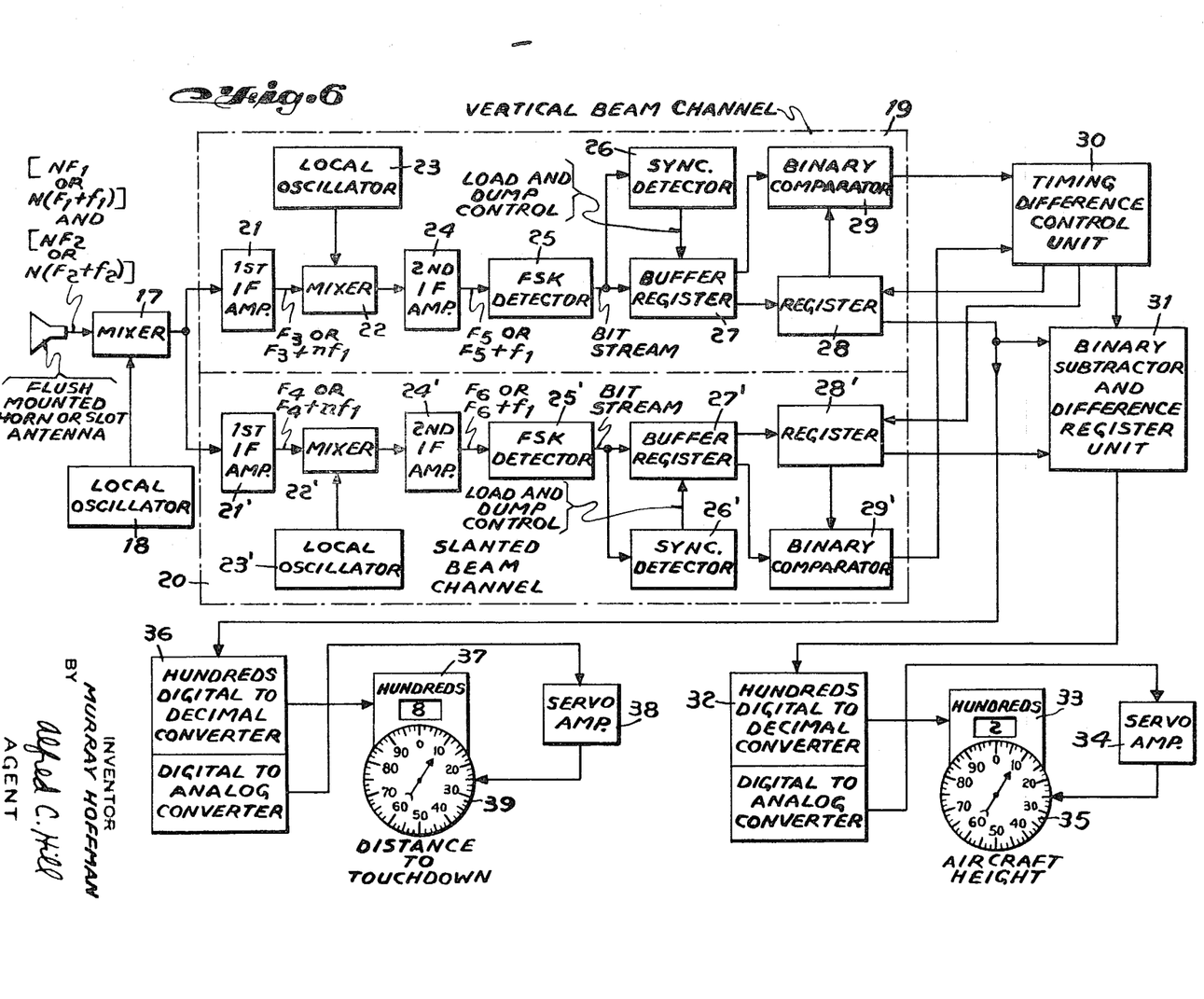
FIG. 6 is a block diagram illustrating the equipment contained within a landing aircraft to determine the height of the aircraft and the aircraft's distance to touchdown from the non-orthogonal coordinate system of FIG. 1.

Referring to FIG. 6, there is disclosed therein the equipment carried in the aircraft to assist the pilot in landing the aircraft when employing the nonorthogonal coordinate system of the present invention. A flush mounted horn or slot antenna 16 is mounted on the side of the aircraft to point toward the antennas when disposed on one side of the runway as illustrated in FIG. 3. If the antennas were disposed as illustrated in FIG. 4, two antennas would be required one pointing toward each side of the runway. This side ways direction of the antenna or antennas is to ensure reception in the aircraft from the ground beacons when the aircraft is descending for a landing. Antenna 16 receives radiation signals from each of the antennas 5 and 7 (FIG. 5) at each of the spaced points. The coded radiation signals received are heterodyned to a first desired intermediate frequency (IF) frequency range by the cooperation of mixer 17 and local oscillator 18. The output of mixer 17 is coupled to the vertical beam channel equipment 19 and the slanted beam channel equipment 20. Each of the equipments 19 and 20 include a first IF amplifier 21 tuned to the appropriate IF frequency of the first IF frequency range, for instance, 11 Mhz in amplifier 21 and 24 Mhz in amplifier 21'. Each of amplifiers 21 will have a bandwidth sufficient to receive the FSK modulation and yet narrow enough to provide receiver sensitivity.

The output from amplifier 21 is either F3 or $F3 + nf1$ while the output from amplifier 21' is F4 or $F4 + nf1$. These output signals from amplifiers 21 are coupled to a second heterodyned arrangement including mixers 22 and local oscillators 23 with the output signal from mixers 22, in a second desired IF frequency range, being coupled to a second IF amplifier 24. The bandwidth of amplifiers 24 are selected to provide increased sensitivity and to provide an appropriate input to the associated FSK detector 25. The output of detectors 25 is the bit stream of the coded signal modulated on the radiation signal intercepted by antenna 16 of the aircraft.

To assure synchronization of the remaining equipment of the aircraft receiver, sync detector 26 responds to the first 12 bits of the code signal to assure synchronization by providing a properly timed load and dump control signal to cause buffer register 27 to store the remaining 12 bits of the code signal giving the distance of its associated spaced point from touchdown.

Assuming that the equipment has previously intercepted a vertical and slanted beam registers 28 and 28' would have stored therein the previously demodulated coded signal represented by the last 12 beams of the transmitted code signal. The binary contents of registers 28 and buffer registers 27 are compared in binary comparator 29. If the comparator detects that the contents of registers 27 and 28 are the same, comparator 29 will produce a binary "0" for coupling to timing difference control unit 30 to prevent the timing signal therefrom to unload registers 28. When comparator 29 detects a change on the contents of registers 27 and 28, comparator 29 will produce a binary "1" output which will enable the timing signal from unit 30 to empty the contents of registers 28 and 28' and to receive the contents of the registers 27 and 27'. The contents of registers 28 and 28' are coupled to binary subtractor and difference register 31 wherein the code distance information of the slanted beam is subtracted from the coded distance information of the adjacent vertical beam to thereby provide a difference signal for storing in a register which is equal to the height of the aircraft above the runway or the approach when angle A of FIG. 1 is 45°. The readout from register 31 is controlled by unit 30 and will occur only when comparators 29 indicate a change. The read out from the register of unit 31 would be coupled to a combined converter unit 32 which will perform a digital to decimal conversion in the digital to decimal converter on those binary bits representing hundreds of feet with the remainder of the binary bits being converted to an analog form in the digital to analog converter. The output of the digital to decimal converter will drive a digital counter to illustrate to the pilot the number of hundreds of feet while the output of the digital to analog converter through servo amplifier 34 will drive analog meter 35 to show the tens and units parts of 100 feet. It would, of course, be possible to provide the entire coded output of unit 31 to a digital to decimal converter to drive a digital meter such as a neon tube display. However, an analog meter 35 is preferred, since the information presented would be buffered to the pilot and thereby eliminate confusion due to the flickering of the units and tens display of the decimal neon tube display associated with a digital readout.

To obtain the distance to touchdown, the output of register 28 is coupled to unit 36 substantially identical to unit 32 with the output of the digital to decimal converter driving the hundreds display unit 37 and the digital to analog converter output through servo amplifier 38 driving an analog meter 39.

If it is assumed that the bit stream rate of each of the channel equipments 19 and 20 is 120 kilo bits per second, the output of unit 31 would be at 1,200 bits per second rate due to the operation of comparators 29 and unit 30. This is due to the fact that as previously stated ten frames of a single radiated signal would be received in the aircraft when traveling in a beam. Thus, the contents of registers 27 and 28 would remain the same for 10 frames. Comparator 29 would detect this lack of change and would inhibit the control signals to read out registers 28 and 28' for 10 frames and at the same time would inhibit the timing signal from control 30 for reading out the register of unit 31.

Control 30 may be implemented in many different ways, one of which would include having a clock at the bit stream rate of 120 kilo bits per second with a monostable multivibrator coupled to the input from comparators 29 and 29' having a time constant sufficient to provide a "1" output for the duration of 12 bits (the distance information bits). The monostable output signal is coupled to associated AND gates so that the clock signals are inhibited from reaching registers 28 and 28' and also unit 31 for as long as comparators 29 produces a "0" output. The AND gates supplying the time signals for the unit 31 and registers 28 and 28' would only be rendered operative when comparator 29 and 29' produces a "1" output which is used to trigger the monostable multivibrators. The multivibrators will remain in the "1" state sufficiently long to empty registers 28 and 28' and the register of unit 31 and to permit registers 28 and 28' to be filled with the new code from registers 27 and 27'.

The foregoing description of the operation of unit 31 has been for the situation where angle A of FIG. 1 is equal to 45°. Where angle A is equal to a value other than 45° greater than 5° but less than 90°, the value of the tangent of this angle must be taken into consideration. There are a number of ways which the difference produced by the binary subtractor of unit 31 can be multiplied by the tangent of angle A. One way would be to build in a factor in the aircraft height display device to increase the value displayed by a factor equal to the tangent of angle A for a particular non-orthogonal coordinate system. Alternatively, the binary difference could be converted to an analog signal then multiplied in an analog fashion by a factor equal to the value of the tangent of angle A prior to being displayed solely on an analog aircraft height display. Another way would be to convert the binary difference to an analog value, multiply this analog value by the value of the tangent of the angle A, reconvert the resultant analog value to a binary value and then display the value of the aircraft height as illustrated in FIG. 6.

The components of FIGS. 5 and 6 are simple and lend themselves to construction by present day integrated circuit techniques. This would result in a solid state low power microwave transmitter for each of the pair of radiation signals from the associated spaced points for the beacon of FIG. 5 and the equipment of FIG. 6 would be compact enough to be contained, within the aircraft, in the space approximately equal to the size of a shoe box. It is obvious that the aircraft receiver as well as the ground beacon is simple and due to integrated circuit techniques would be of small size and the cost thereof would not be excessive. In addition, the employment of mat strip techniques in the manufacture of antennas 5 and 7 would be relatively inexpensive, since they can be produced by printed circuit techniques.

GCA radar systems, as a rule, can only guide one aircraft at a time to a landing on a given runway. However, the landing system of the present invention will enable a number of different aircraft to employ the landing system, simultaneously each aircraft being a different distance from touchdown along the runway and its approach and, thus, intercepting in a non-interfering fashion different slant and vertical beams.

While I have described above the principles of my present invention in connection with specific apparatus, it is to be clearly understood that this description is made only by way of example and not as a limitation to the scope of my invention as set forth in the objects thereof and in the accompanying claims.

I CLAIM:

1. An instrument landing system for a runway and an approach to said runway to assist an aircraft in landing on said runway comprising:

first means disposed in juxtaposition to said runway and said approach to provide a non-orthogonal coordinate system of modulated radiation signals over said runway and said approach, each pair of said radiation signals forming said coordinate system appearing to come from different predeterminedly spaced points along said runway and said approach extending in the direction of said approach commencing with and including a desired touchdown point on said runway, said modulation of said radiation signals providing the distance of its associated one of said spaced points from said touchdown point; and second means disposed in said aircraft for detecting said modulation of those of said radiation signals intercepted by said aircraft to provide a first indication of the height of said aircraft above said runway and said approach and a second indication of the distance said aircraft is from said touchdown point;

said first means including a first antenna disposed in juxtaposition to each of said spaced points for radiating a vertical modulated radiation signal with respect to said runway and said approach; and a second antenna disposed in juxtaposition to each of said spaced points for radiating a slanted modulated radiation signal, the angle of said slanted radiation signal with respect to said runway and said approach being equal to a value greater than 5° but less than 90°.

2. A system according to claim 1, wherein said angle of said slanted radiation signals is equal to 45°.

3. A system according to claim 1, wherein each of said first and second antennas radiate a fan beam.

4. A system according to claim 1, wherein each of said first and second antennas are disposed along one side of said runway and said approach.

5. A system according to claim 1, wherein each of said first antennas is disposed along one side of said runway and said approach, and each of said second antennas is disposed along the other side of said runway and said approach.

6. A system according to claim 1, wherein said first means further includes in juxtaposition to each of said spaced points:
- a first source of distance information signal to provide the distance of its associated one of said spaced points from said touchdown point,
- a second source of a first carrier signal having a first frequency,
- a third source of a second carrier signal having a second frequency different than said first frequency,
- third means coupled to said first source, said second source and said first antenna to modulate said first carrier signal with said distance information signal and to coupled said modulated first carrier signal to said first antenna for radiation therefrom as said vertical modulated radiation signal, and
- fourth means coupled to said first source, said third source and said second antenna to modulate said second carrier signal with said distance information signal and to couple said modulated second carrier signal to said second antenna for radiation therefrom as said slanted modulated radiation signal.

7. An instrument landing system for a runway and an approach to said runway to assist an aircraft in landing on said runway comprising:
- first means disposed in juxtaposition to said runway and said approach to provide a non-orthogonal coordinate system of modulated radiation signals over said runway and said approach, each pair of said radiation signals forming said coordinate system appearing to come from different predeterminedly spaced points along said runway and said approach extending in the direction of said approach commencing with and including a desired touchdown point on said runway, said modulation of said radiation signals providing the distance of its associated one of said spaced points from said touchdown point; and
- second means disposed in said aircraft for detecting said modulation of those of said radiation signals intercepted by said aircraft to provide a first indication of the height of said aircraft above said runway and said approach and a second indication of the distance said aircraft is from said touchdown point;
- one of said radiation signals of each of said pair of said radiation signals is radiated vertically with respect to said runway and said approach,
- the other of said radiation signals of each of said pair of said radiation signals is radiated at an angle A with respect to said runway and said approach, angle A having a value greater than 5° but less than 90°, and
- said second means includes
  - third means to recover said distance of the associated one of said spaced points from which an intercepted one of said one of said radiation signals is radiated,
  - fourth means to recover said distance of the associated one of said spaced points from which an intercepted one of said other of said radiation signals, adjacent said intercepted one of said one of said radiation signals, is radiated,
  - fifth means coupled to said third means and said fourth means to subtract said recovered distance of said intercepted one of said other of said radiation signals from said recovered distance of said intercepted one of said one of said radiation signals and to multiply the resultant difference by the value of the tangent of said angle A to produce an output signal equal to the height of said aircraft above said runway and said approach,
  - sixth means coupled to said fifth means responsive to said output signal to display the height of said aircraft above said runway and said approach, and
  - seventh means coupled to said third means responsive to said recovered distance of said intercepted one of said one of said radiation signals to display the distance said aircraft is from said touchdown point.

8. An instrument landing system for a runway and an approach to said runway to assist an aircraft in landing on said runway comprising:
- first means disposed in juxtaposition to said runway and said approach to provide a non-orthogonal coordinate system of modulated radiation signals over said runway and said approach, each pair of said radiation signals forming said coordinate system appearing to come from different predeterminedly spaced points along said runway and said approach extending in the direction of said approach commencing with and including a desired touchdown point on said runway, said modulation of said radiation signals providing the distance of its associated one of said second spaced points from said touchdown point; and
- second means disposed in said aircraft for detecting said modulation of those of said radiation signals intercepted by said aircraft to provide a first indication of the height of said aircraft above said runway and said approach and a second indication of the distance said aircraft is from said touchdown point;
- one of said radiation signals of each of said pair of said radiation signals is radiated vertically with respect to said runway and said approach,
- the other of said radiation signals of each of said pair of said radiation signals is radiated at an angle of 45° with respect to said runway and said approach, and
- said second means includes:
  - third means to recover said distance of the associated one of said spaced points from which an intercepted one of said one of said radiation signals is radiated, fourth means to recover said distance of the associated one of said spaced points from which an intercepted one of said other of said radiation signals, adjacent said intercepted one of said one of said radiation signals, is radiated, fifth means coupled to said third means and said fourth means to subtract said recovered distance of said intercepted one of said other of said radiation signals from said recovered distance of said intercepted one of said one of said radiation signals to produce an output signal equal to the height of said aircraft above said runway and said approach, sixth means coupled to said fifth means responsive to said output signal to display the height of said aircraft above said approach, and seventh means coupled to said third means responsive to said recovered distance of said intercepted one of said one of said radiation signals to display the distance said aircraft is from said touchdown point.

9. In an instrument landing system for a runway and an approach to said runway to assist on aircraft in landing on said runway, an arrangement disposed in juxtaposition to said runway and said approach to provide a non-orthogonal coordinate system of modulated radiation signals over said runway and said approach comprising:

a first antenna disposed in juxtaposition to each of a plurality of predeterminedly spaced points along said runway and said approach extending in the direction of said approach commencing with and including a desired touchdown point on said runway, each of said first antennas radiating a vertical modulated radiation signal with respect to said runway and said approach, each of said vertical radiation signals appearing to radiate from the associated one of said spaced points, said modulation of each of said vertical radiation signals providing the distance of its associated one of said spaced points from said touchdown point; and a second antenna disposed in juxtaposition to each of said spaced points, each of said second antennas radiating a slanted modulated radiation signal, the angle of each of said slanted radiation signals with respect to said runway and said approach being equal to a value greater than 5° but less than 90°, each of said slanted radiation signals appearing to radiate from the associated one of said spaced points, said modulation of each of said slanted radiation signals providing the distance of its associated one of said spaced points from said touchdown point.

10. An arrangement according to claim 9, wherein said angle of said slanted radiation signals is equal to 45°.

11. An arrangement according to claim 9, further including in juxtaposition to each of said spaced points:

a first source of distance information signal to provide the distance of its associated one of said spaced points from said touchdown point;

a second source of a first carrier signal having a first frequency;

a third source of a second carrier signal having a second frequency different than said first frequency;

first means coupled to said first source, said second source and said first antenna to modulate said first carrier signal with said distance information signal and to couple said modulated first carrier signal to said first antenna for radiation therefrom as said vertical modulated radiation signal; and second means coupled to said first source, said third source and said second antenna to modulate said second carrier signal with said distance information signal and to couple said modulated second carrier signal to said second antenna for radiation therefrom as said slanted modulated radiation signal.

12. In an instrument landing system for a runway and an approach to said runway to assist an aircraft in landing on said runway having a non-orthogonal coordinate system of modulated radiation signals over said runway and said approach, said coordinate system being provided by radiation of a vertical modulated radiation signal with respect to said runway and said approach from each of a plurality of predeterminedly spaced points along said runway and said approach extending in the direction of said approach commencing with and including a desired touchdown point on said runway and by radiation of a slanted modulated radiation signal from each of said spaced points, the angle A of each of said slanted radiation signals with respect to said runway and said approach being greater than 5° but less than 90°, said modulation of each of said vertical and slanted radiation signals providing the distance of its associated one of said spaced points from said touchdown point, an arrangement disposed in said aircraft to display the height of said aircraft above said runway and said approach and to display the distance said aircraft is from said touchdown point comprising:

first means to recover said distance of the associated one of said spaced points from said touchdown point from which an intercepted one of said vertical radiation signals is radiated;

second means to recover said distance of the associated one of said spaced points from said touchdown point from which an intercepted one of said slanted radiation signals, adjacent said intercepted one of said vertical radiation signals, is radiated;

third means coupled to said first means and said second means to subtract said recovered distance of said intercepted one of said slanted radiation signals from said recovered distance of said intercepted one of said vertical radiation signals and to multiply the resultant difference by the value of the tangent of said angle A to produce an output signal equal to the height of said aircraft above said runway and said approach;

fourth means coupled to said third means responsive to said output signal to display said height of said aircraft; and fifth means coupled to said first means responsive to said recovered distance of said intercepted one of said vertical radiation signals to display the distance said aircraft is from said touchdown point.

13. An arrangement according to claim 12, wherein said angle A is equal to 45°, and said third means only subtracts said recovered distance of said intercepted one of said slanted radiation signals from said recovered distance of said intercepted one of said vertical radiation signals to produce said output signal.

* * * * *